US006325142B1

(12) United States Patent
Bosley et al.

(10) Patent No.: US 6,325,142 B1
(45) Date of Patent: Dec. 4, 2001

(54) TURBOGENERATOR POWER CONTROL SYSTEM

(75) Inventors: Robert W. Bosley, Cerritos; Edward C. Edelman, Agoura Hills, both of CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 0 days.

(21) Appl. No.: 09/316,896

(22) Filed: May 22, 1999

Related U.S. Application Data

(63) Continuation-in-part of application No. 09/003,078, filed on Jan. 5, 1998, now Pat. No. 6,031,294, and a continuation-in-part of application No. 09/181,213, filed on Oct. 27, 1998.

(51) Int. Cl.$^7$ ........................... E21B 43/00; F04B 49/00; F01D 15/10
(52) U.S. Cl. .................................. 166/53; 417/12; 290/52
(58) Field of Search ................................ 166/53; 417/12; 318/140, 430, 723, 801; 290/46, 52; 74/41

(56) References Cited

U.S. PATENT DOCUMENTS 3,591,844 * 7/1971 Schonebeck ........................... 290/31
4,361,791 * 11/1982 Plunkett ............................... 318/723

(List continued on next page.)

OTHER PUBLICATIONS

J. P. Byrd, Pumping Unit Geometry vs. Prime Mover Speed Variation as a Method of Torsional Reduction in a Beam and Sucker Rod Pumping System, Society of Petroleum Engineers Production Technology Symposium, Nov. 14–15, 1983, SPE 12362.

S. G. Gibbs, Utility of Motor Speed Measurements in Pumping Well Analysis and Control, Society of Petroleum Engineers 59$^{th}$ Annual Technical Conference and Exhibition, Sep. 16–19, 1984, SPE 13198.

(List continued on next page.)

Primary Examiner—David Bagnell
Assistant Examiner—Jennifer Dougherty
(74) Attorney, Agent, or Firm—Irell & Manella, LLP

(57) ABSTRACT

A power control system for a turbogenerator which provides electrical power to one or more pump-jack oil wells. When the induction motor of a pump-jack oil well is powered by three-phase utility power, the speed of the pump-jack shaft varies only slightly over the pumping cycle but the utility power requirements can vary by four times the average pumping power. This power variation makes it impractical to power a pump-jack oil well with a stand-alone turbogenerator controlled by a conventional power control system. This power control system comprises a turbogenerator inverter, a load inverter, and a central processing unit which controls the frequency and voltage/current of each inverter. Throughout the oil well's pumping cycle, the central processing unit increases or decreases the frequency of the load inverter in order to axially accelerate and decelerate the masses of the down hole steel pump rods and oil, and to rotationally accelerate and decelerate the masses of the motor rotors and counter balance weights. This allows kinetic energy to be alternately stored in and extracted from the moving masses of the oil well and allows the oil pumping power to be precisely controlled. Historical data on the load inverter's frequency versus time profile throughout previous pumping cycles, which resulted in nearly constant turbogenerator power requirements, is utilized to further reduce variations in power.

77 Claims, 8 Drawing Sheets

U.S. PATENT DOCUMENTS

| | | | | |
|---|---|---|---|---|
| 4,413,676 | * | 11/1983 | Kervin | 166/53 |
| 4,508,487 | * | 4/1985 | Taylor et al. | 417/12 |
| 4,633,157 | * | 12/1986 | Streater | 318/723 |
| 5,903,116 | * | 5/1999 | Geis et al. | 318/140 |
| 6,020,713 | * | 2/2000 | Geis et al. | 318/801 |
| 6,023,135 | * | 2/2000 | Gilbreth et al. | 318/140 |
| 6,031,294 | * | 2/2000 | Geis et al. | 290/52 |
| 6,093,975 | * | 7/2000 | Peticolas | 290/52 |

OTHER PUBLICATIONS

J. F. Lea and M. O. Durham, Study of the Cyclical Performance of Berm Pump Motors, Society of Petroleum Engineers Production Operations Symposium, Mar. 13–14, 1989, SPE 18827.

A. B. Neely, K. E. Opal, and H. A. Tripp, Power Savings and Load Reductions on Sucker Rod Pumping Wells, $64^{th}$ Annual Technical Conference and Exhibition of the Society of Petroleum Engineers, Oct. 8–11, 1989, SPE 19715.

C. G. Guffey, J. D. Rogers, and L. R. Hester II, Field Testing of Variable–Speed Beam–Pump Computer Control, Society of Petroleum Engineers Production Engineering, May 1991, pp. 155–160.

* cited by examiner

TURBOGENERATOR POWER CONTROL SYSTEM

PRIORITY INFORMATION

This application is a continuation-in-part of [U.S. Ser. No. 09/003,078 filed Jan. 5, 1998, now U.S. Pat. No. 6,031,294, and of] Ser. No. 09/181,213 filed Oct. 27, 1998, the entire disclosure of which is incorporated herein by reference.

TECHNICAL FIELD

This invention relates to the general field of turbogenerator controls and more particularly to an improved high speed turbogenerator control system for providing electrical power to motors which have power requirements that normally vary in a repetitive manner over time.

BACKGROUND OF THE INVENTION

There are many industrial and commercial applications that utilize electrical motors to produce repetitive axial motions. The electrical motor's rotary motion can be converted into axial motion by any number of mechanisms such as cams, cranks, scotch yokes, or cable drums just to name a few. In any such application, the electrical power requirement of the motor is inherently variable and is cyclically locked to the repetitive axial motion. The motor power in these applications varies both due to inertial effects (the need to accelerate and decelerate the axially moving components of the system and the need to accelerate and decelerate the rotationally moving components of the system) and due to the work effects (changes in the work performed by the axially moving components as a function of their axial position and velocity). The magnitude of the motor power variation with time can be many times the average power requirement of the motor. Both the inertial effects and the work effects can cause the motor to function as a generator which produces electrical power at various times in the system's cyclical motion.

An elevator is one well-known example of an electrical motor producing axial motion wherein the motor's electrical power requirements vary with the passenger load, the axial velocity of the elevator and the axial acceleration/deceleration of the elevator. Deliberate deceleration or braking can be achieved by recovering the excess energy in the elevator's mechanical system (e.g. during the descent of a heavily loaded elevator) utilizing regeneration to convert that mechanical energy into electrical energy which can go back into an electrical distribution system.

Another example of a motor producing repetitive axial motion is a pump-jack type oil well. Also known as a walking beam (a large beam arranged in teeter totter fashion) or a walking-horse oil well, the pump-jack oil well generally including a walking beam suitably journaled and supported in an overhanging relationship to the oil well borehole so that a string of rods (as long as two miles) can be attached to the reciprocating end of the walking beam with the bottom end of the rods attached to a lift pump chamber at the bottom of the bore hole. A suitable driving means, such as an electrical motor or internal combustion engine, is connected to a speed reduction unit which drives a crank which in turn is interconnected to the other end of the walking beam by a pitman.

Conventionally, pump-jack oil wells utilize an induction motor powered by constant frequency, three-phase electrical power from a utility grid. The pump-jack pumping cycle varies the induction motor's speed only slightly as allowed by plus or minus a few percent of motor slip. However, the induction motor power typically varies over the pumping cycle by about four (4) times the average motor power level. At two (2) points in the pumping cycle, the motor power requirement peaks and at two (2) other points, the motor power requirements are at a minimum. Typically, at one of these minimum power requirement points in the pumping cycle, the induction motor extracts enough kinetic energy and/or work from the moving masses of the well to be able to function as a generator and produce electrical power which must be absorbed by the utility grid.

Whether the pump-jack oil well is driven by an induction motor or by an internal combustion engine, there is excess mechanical energy at some point(s) in the pumping cycle which must be absorbed to prevent excessive velocity induced stresses in the pump-jack oil well moving parts. When a pump-jack oil well is powered by an internal combustion engine, engine compression is the means by which this energy is dissipated (compression losses) while in the normal utility grid powered induction motor system, the induction motor is periodically driven at overspeed causing it to return power to the utility grid.

When a pump-jack type oil well is powered by constant frequency electrical power from a utility grid or a conventionally controlled turbogenerator, the oil extraction pumping rate may not be sufficient to keep up with the rate at which oil seeps into the well. In this case, potential oil production and revenues may be lost. Alternately, the oil extraction pumping rate may be greater than the rate at which oil seeps into the well. In this case, the oil well may waste power when no oil is being pumped or it may be necessary to shut down the oil well for a period of time to allow more oil to seep into the well.

For the reasons stated above, what is needed is an improved technique for providing power [generally] suitable for pump-jack oil well systems.

SUMMARY OF THE INVENTION

It is an object of the present invention to provide a turbogenerator with a low frequency inverter connected to an electric motor powering a cyclic motion machine, and a controller. The controller controls the turbogenerator and varies the frequency of the inverter to provide a generally constant power level to the electric motor.

An additional object of the present invention is to provide a turbogenerator with a low frequency inverter connected to an electric motor powering a pump-jack oil well, and a controller controlling the turbogenerator and inverter. The controller varies the frequency of the inverter to maintain a generally constant power output level for the turbogenerator.

A further object of the present invention is to provide a method to reduce variations in the power level provided to a cyclic motion machine having cyclically varying power requirements. The method includes connecting an induction motor to the cyclic motion machine to drive the machine, connecting a load inverter to the motor to provide power to the motor, and connecting a controller to the load inverter to control the power provided to the motor by varying the load inverter frequency. The controller monitors the inverter frequency certain machine positions during each machine cycle for a number of machine cycles to accumulate historical data. The controller further varies the load inverter frequency over each machine cycle in accordance with the accumulated historical data to reduce variations in the power level required by the motor.

The machine may be an oil well pump-jack. The controller may vary the voltage along with the frequency of the inverter. The controller and inverter may also be providing power to more than one motor, by varying the load inverter frequency in accordance with the average historical data of all motors at each machine position.

BRIEF DESCRIPTION OF THE DRAWINGS

Figure 1:
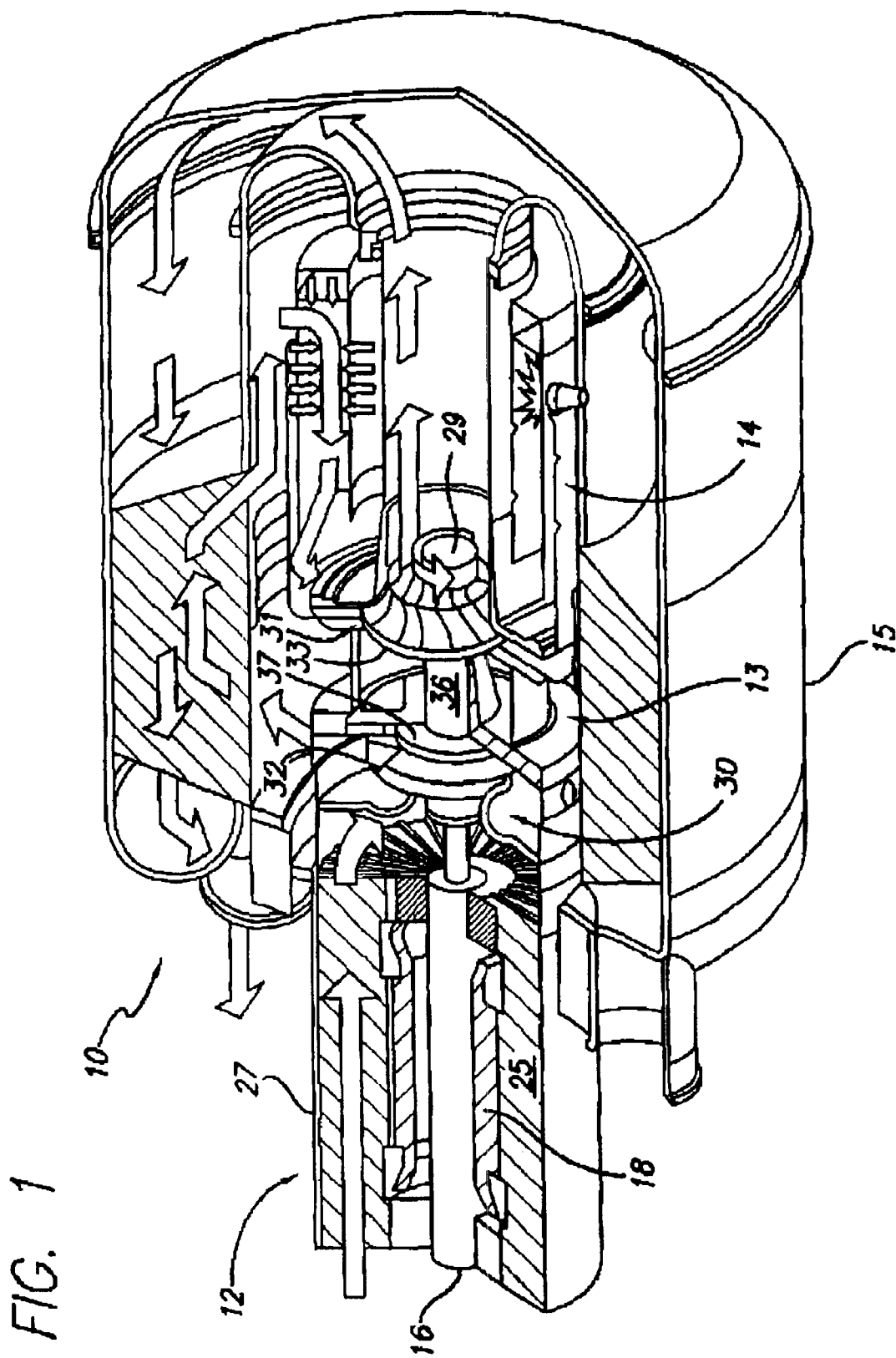
Figure 2:
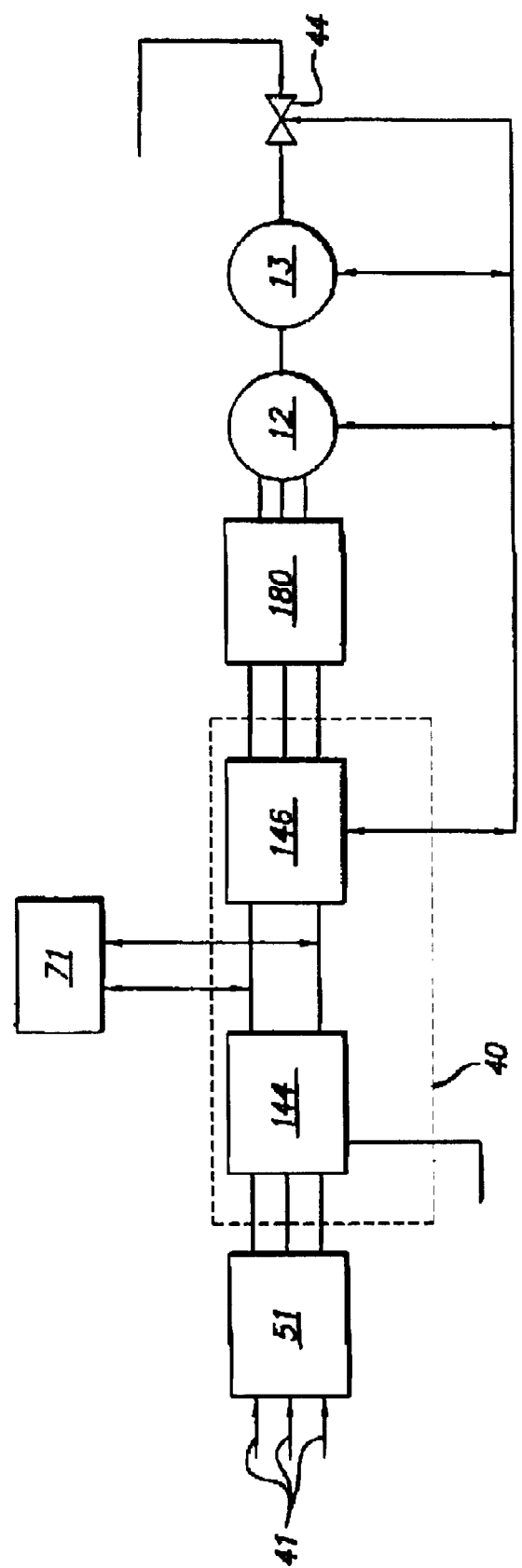
Figure 3:
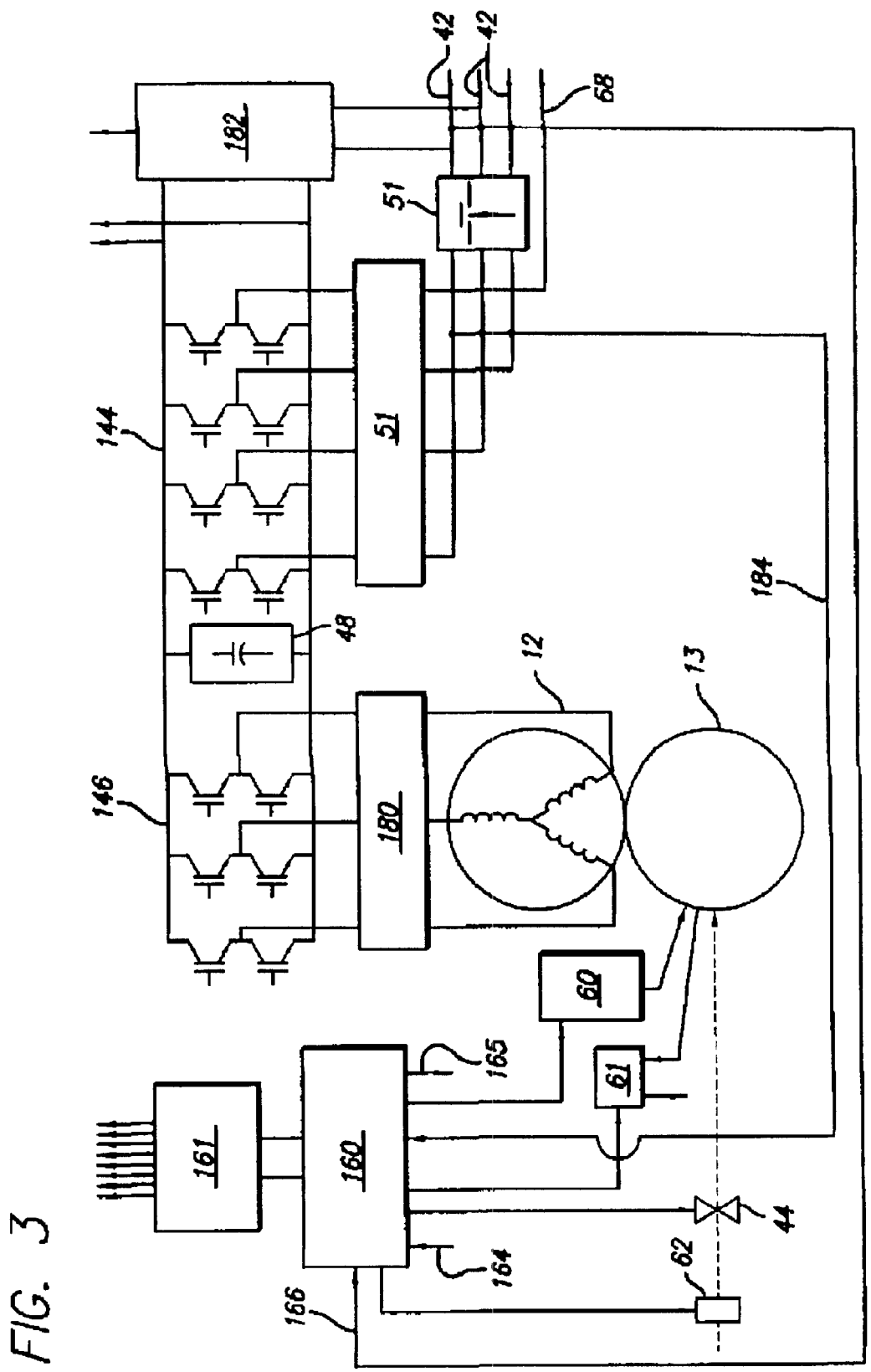
Figure 4:
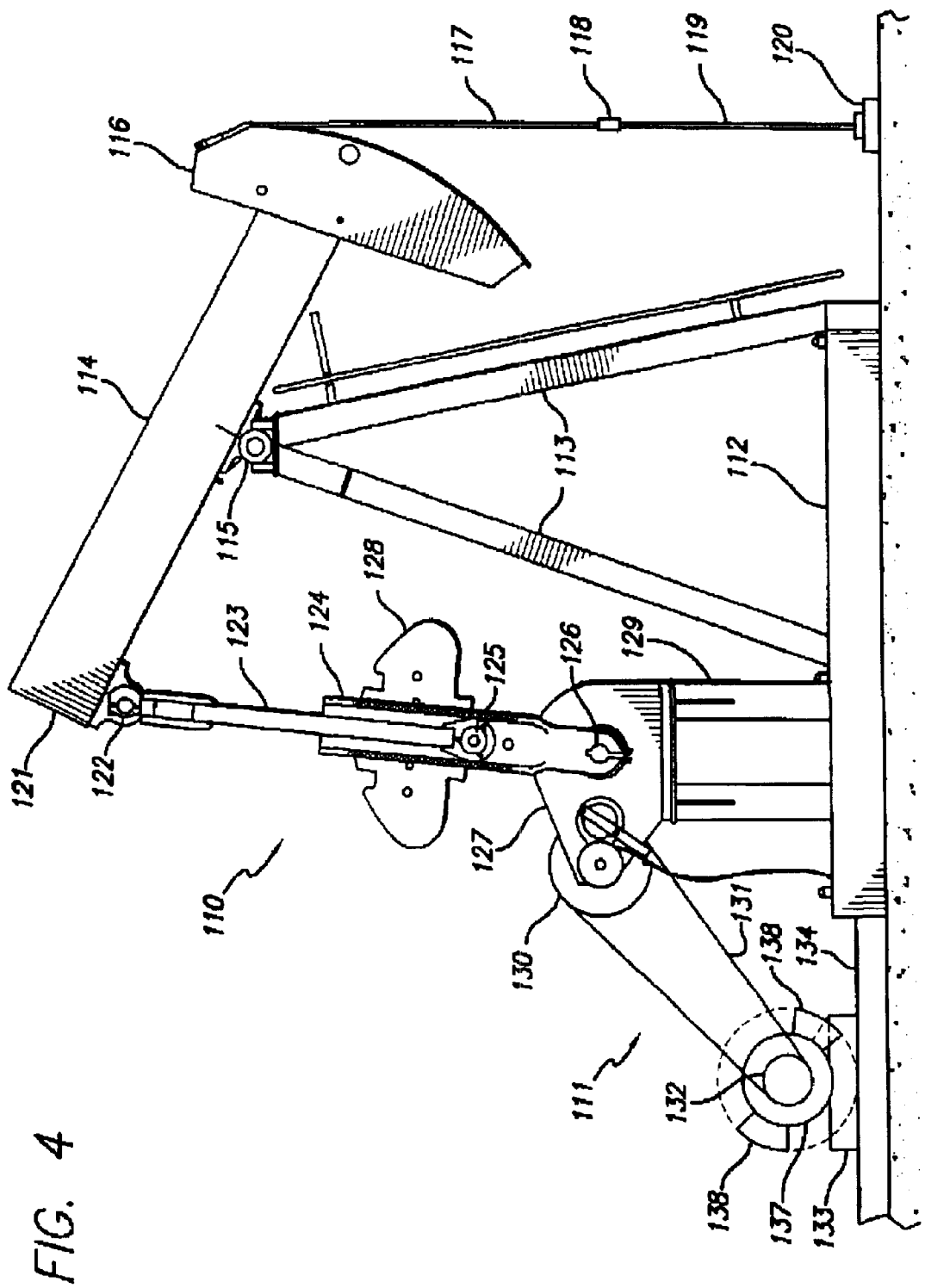
Figure 5:
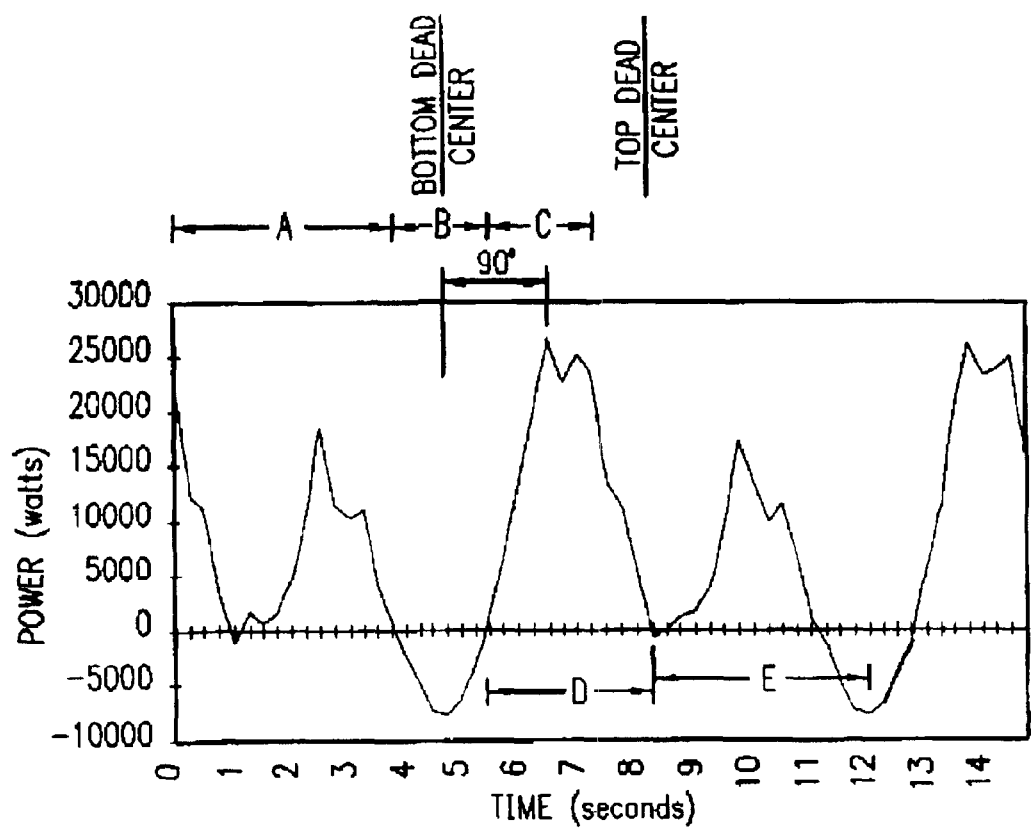
Figure 6:
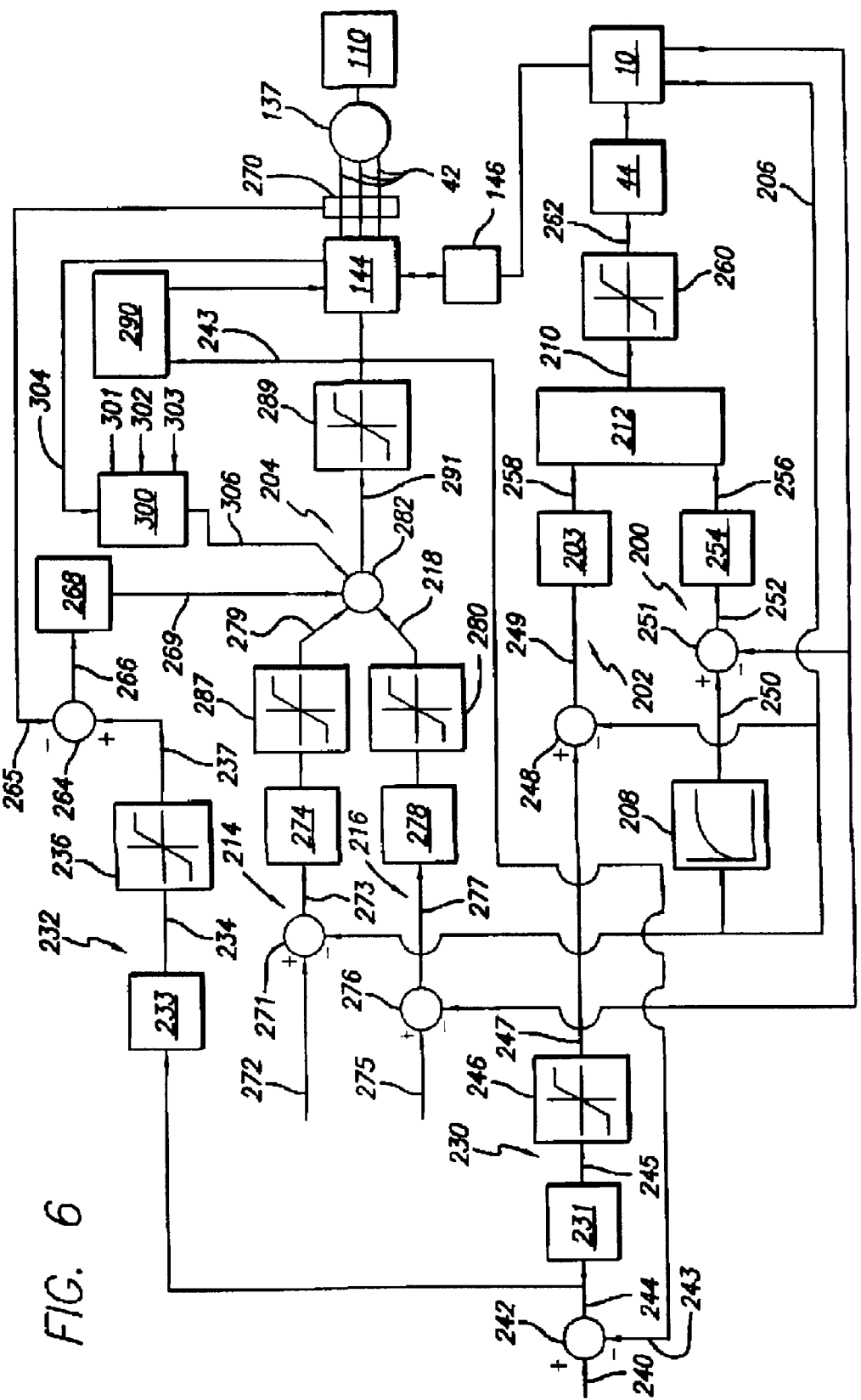
Figure 7:
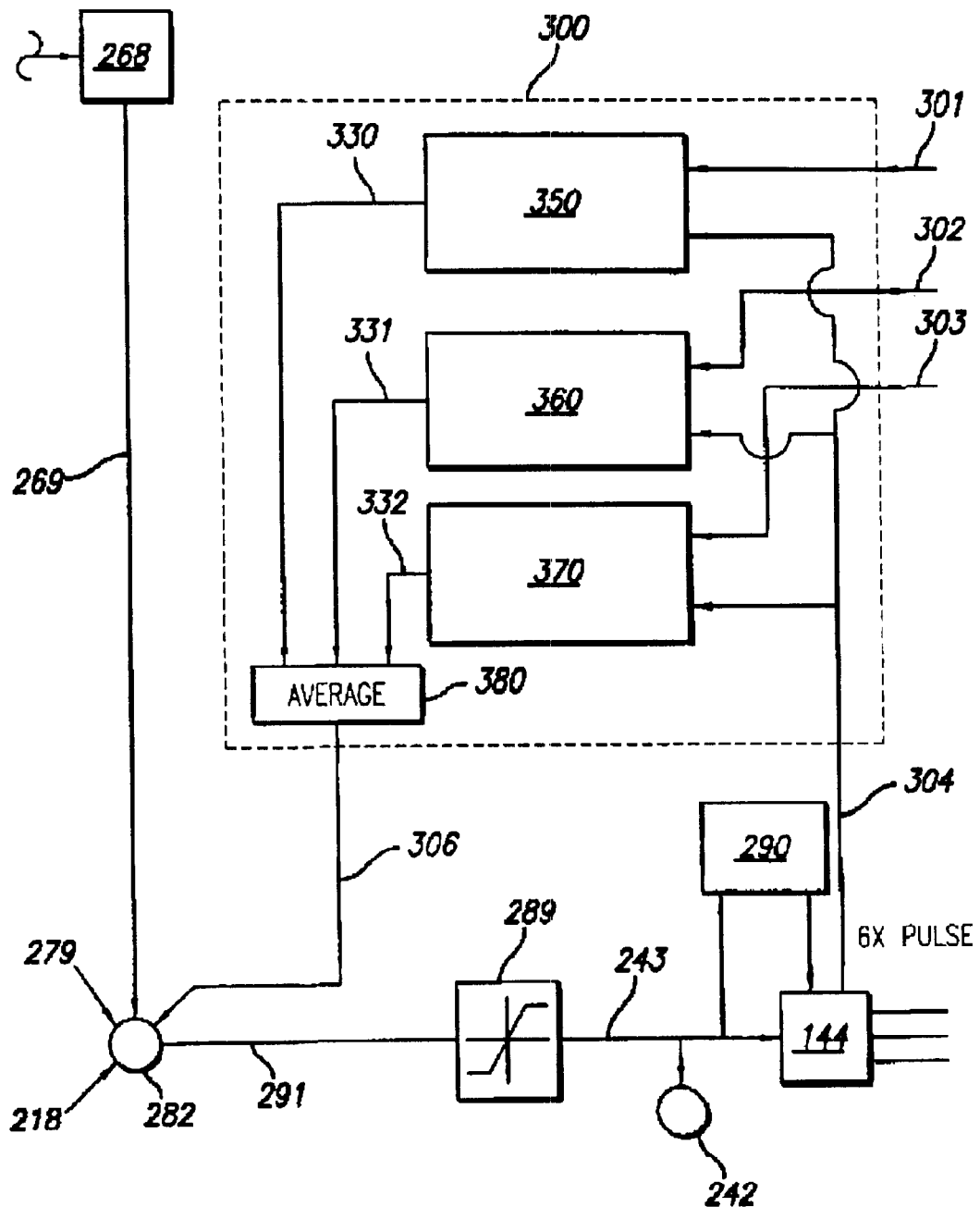
Figure 8:
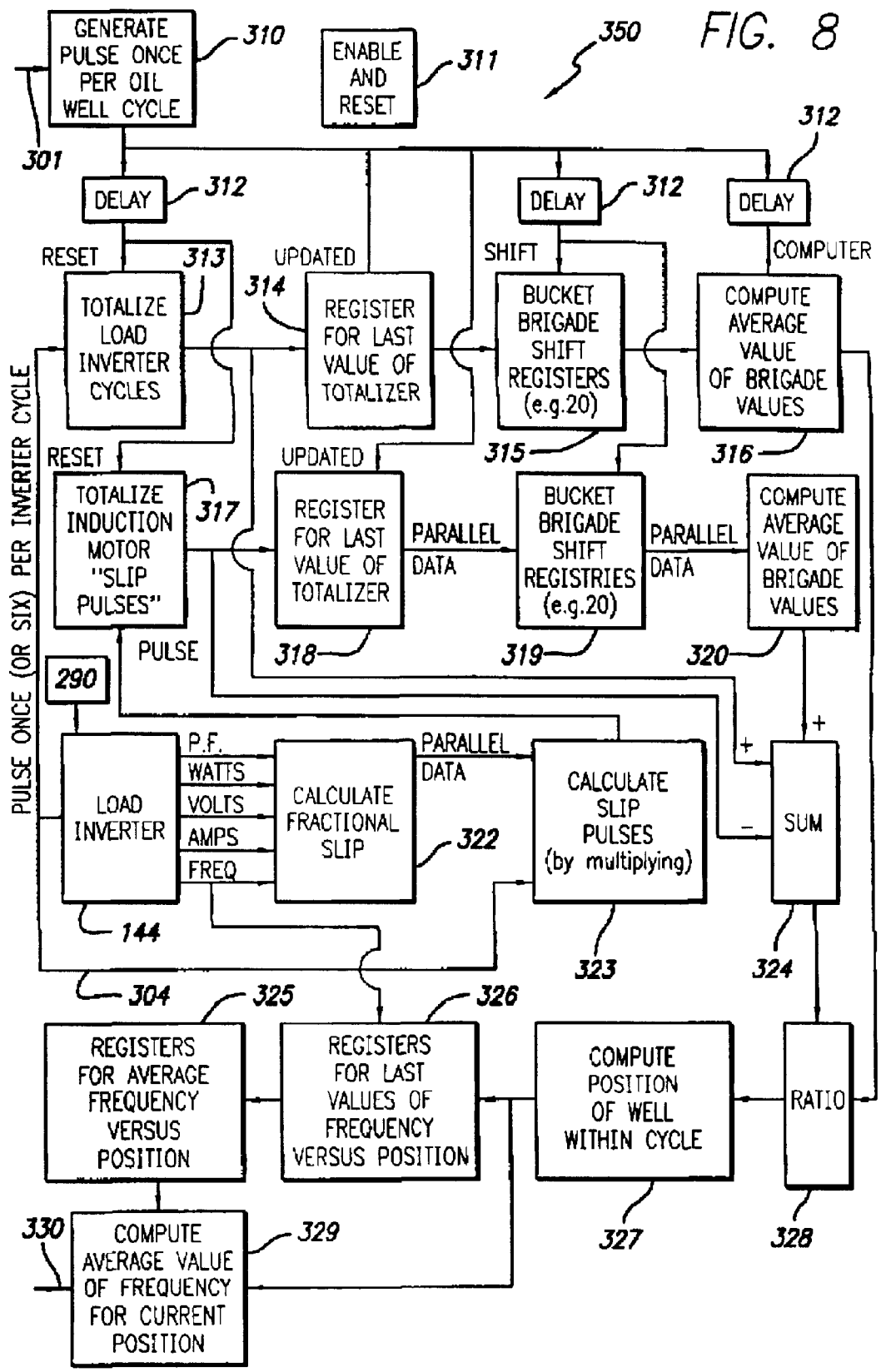

Having thus described the present invention in general terms, reference will now be made to the accompanying drawings in which:

FIG. 1 is a perspective view, partially cut away, of a permanent magnet turbogenerator/motor for use with the power control system of the present invention;

FIG. 2 is a functional block diagram of the interface between a turbogenerator/motor controller and the permanent magnet turbogenerator/motor illustrated in FIG. 1;

FIG. 3 is a functional block diagram of the permanent magnet turbogenerator/motor controller of FIG. 2;

FIG. 4 is a plan view of a pump-jack oil well system for use with the power control system of the present invention;

FIG. 5 is a graph of power requirements in watts versus operating time in seconds for the pump-jack oil well system of FIG. 4;

FIG. 6 is a detailed functional block diagram of the power control system of the present invention;

FIG. 7 is a functional block diagram of the historical computation subsection of the power control system for three oil wells; and FIG. 8 is a detailed functional diagram of the historical computation subsection of the power control system for a single oil well.

DETAILED DESCRIPTION OF THE PREFERRED EMBODIMENTS

A micro turbogenerator with a shaft mounted permanent magnet motor/generator can be utilized to provide electrical power for a wide range of utility, commercial and industrial applications. While an individual permanent magnet turbogenerator may only generate 24 to 50 kilowatts, power plants of up to 500 kilowatts or greater are possible by linking numerous permanent magnet turbogenerators together. Peak load shaving power, grid parallel power, standby power, and remote location (stand-alone) power are just some of the potential applications for which these lightweight, low noise, low cost, environmentally friendly, and thermally efficient units can be useful.

The conventional power control system for a turbogenerator produces constant frequency, three-phase electrical power that closely approximates the electrical power produced by utility grids. If a turbogenerator with a conventional system for controlling its power generation were utilized to power a pump-jack type oil well, the turbogenerator's power capability would have to be sufficient to supply the well's peak power requirements, that is, about four (4) times the well's average power requirement. In other words, the turbogenerator would have to be about four (4) times as large, four (4) times as heavy, and four (4) times as expensive as a turbogenerator that only had to provide the average power required by the oil well rather than the well's peak power requirements.

There are other inherent difficulties present if a turbogenerator with a conventional power control system is used to provide electrical power for a pump-jack type of oil well. If, for example, the oil well is in the part of the pumping cycle where it normally generates rather than consumes power, the operating speed of the rotating elements of the turbogenerator will tend to increase. The fuel control system of the power control system will attempt to reduce the fuel flow to the turbogenerator combustor in order to prevent the turbogenerator's rotating elements from overspeeding which, in turn, risks quenching the flame in the combustor (flame out). A minimum fuel flow into the combustor must be maintained to avoid flame out. This results in a minimum level of power generation, which together with the power produced by the oil well itself, must be deliberately dissipated as wasted power by the turbogenerator system, usually with a load resistor but sometimes with a pneumatic load, either of which will reduce the turbogenerator system efficiency.

Also, when the power requirements for the oil well fall below the well's peak requirement, the conventional turbogenerator control system will reduce the turbogenerator speed and the turbogenerator combustion temperature. Since the present systems do not have any means to dissipate excess power, the rapidly fluctuating load levels and unloading operation produce undesirable centrifugal and thermal cycles stresses in many components of the turbogenerator system which will tend to reduce turbogenerator life, reliability and system efficiency.

The turbogenerator control system of the present invention includes a high frequency inverter synchronously connected to the permanent magnet motor/generator of a turbogenerator, a [low frequency] load inverter connected to the induction motor(s) of the pump-jack oil well(s), a direct current bus electrically connecting the two (2) inverters, and a central processing unit which controls the frequency and voltage/current of each of the inverters. This control system can readily start the turbogenerator.

Throughout the oil well's pumping cycle, the central processing unit increases or decreases the frequency of the [low frequency] load inverter in order to axially accelerate and decelerate the masses of the down hole steel pump rod(s) and oil and to rotationally accelerate and decelerate the masses of the motor rotor and counter balance weights.

Precisely controlling the acceleration and deceleration of both the axially moving and rotational moving masses of the oil well allows relatively independent control of the rate at which shaft power and electrical power can be converted into kinetic energy. This kinetic energy can be cyclically stored by and extracted from the moving masses. Just as changing the rotational velocity versus time profile of the well's rotating components allows the well to function as a conventional flywheel, changing the normal axial velocity versus time profile of the well's massive down hole moving components and oil, allows the well to function as an axial flywheel. Adjusting the frequency of the [low frequency] load inverter and the resulting speed of the well's induction motor also allows the oil pumping power to be controlled as a function of time. The sum of the well's oil pumping power requirements and the power converted into or extracted from the kinetic energies of the moving oil well masses is controlled so as to be nearly constant.

Thus, the [combination] system of tailoring oil well pumping power as a function of time and precisely controlling the insertion and extraction of kinetic energy into and out of the moving masses of oil wells results in stabilizing the power requirements demanded of a turbogenerator powering pump-jack oil wells. This in turn allows the size of the turbogenerator to be down sized by a factor of perhaps four to one (4 to 1), avoids extreme variations in turbogenerator operating speed and combustion temperature as well as avoids possible damage to the turbogenerator caused by cyclical variations in thermal and centrifugal stresses and possible damage to the controller/inverter electronics caused by variation in turbogenerator voltage.

It is, therefore, a principal aspect of the present invention to provide a system to control the operation of a turbogenerator and its electronic inverters.

It is another aspect of the present invention to control the flow of fuel into the turbogenerator combustor.

It is another aspect of the present invention to control the temperature of the combustion process in the turbogenerator combustor and the resulting turbine inlet and turbine exhaust temperatures.

It is another aspect of the present invention to control the rotational speed of the turbogenerator rotor upon which the centrifugal compressor wheel, the turbine wheel, the motor/generator, and the bearings are mounted.

It is another aspect of the present invention to control the torque produced by the turbogenerator power head (turbine and compressor mounted and supported by bearings on a common shaft) and delivered to the motor/generator of the turbogenerator.

It is another aspect of the present invention to control the shaft power produced by the turbogenerator power head and delivered to the motor/generator of the turbogenerator.

It is another aspect of the present invention to control the electrical power produced by the motor/generator of the turbogenerator.

It is another aspect of the present invention to control the operations of the high frequency inverter which inserts/extracts power into/from the motor/generator of the turbogenerator and produces electrical power for the direct current bus of the turbogenerator controller.

It is another aspect of the present invention to control the operations of the [low frequency] load inverter which uses power from the direct current bus of the turbogenerator controller to generate low frequency, three-phase power.

It is another aspect of the present invention to minimize variations in the fuel flow rate into the turbogenerator combustor over the operating cycle of a pump-jack oil well.

It is another aspect of the present invention to minimize variations in the combustion and turbine temperatures of the turbogenerator over the operating cycle of a pump-jack oil well.

It is another aspect of the present invention to minimize variations in the operating speed of the turbogenerator over the operating cycle of a pump-jack oil well.

It is another aspect of the present invention to minimize variations in the shaft torque generated by the turbogenerator power head and delivered to the motor/generator of the turbogenerator over the operating cycle of a pump-jack oil well.

It is another aspect of the present invention to minimize variations in the shaft power generated by the turbogenerator power head and delivered to the motor/generator of the turbogenerator over the operating cycle of a pump-jack oil well.

It is another aspect of the present invention to minimize variations in the level of electrical power extracted from the motor/generator of the turbogenerator and converted into direct current power by the high frequency inverter, or the bridge rectifier, over the operating cycle of a pump-jack oil well.

It is another aspect of the present invention to minimize variations in the level of electrical power extracted from the direct current bus and converted into low frequency, three-phase power by the [low frequency] load inverter over the operating cycle of a pump-jack oil well.

It is another aspect of the present invention to minimize variations in the level of electrical power delivered to, and utilized by, the induction motor(s) of the pump-jack oil well(s) over the operating cycle of a pump-jack oil well.

It is another aspect of the present invention to provide a control system that varies the instantaneous frequency of the [low frequency] load inverter over the operating cycle of a pump-jack oil well.

It is another aspect of the present invention to provide a control system that varies the instantaneous voltage or current of the [low frequency] load inverter over the operating cycle of a pump-jack oil well.

It is another aspect of the present invention to provide a control system where the variation in the instantaneous frequency of the [low frequency] load inverter over the operating cycle of a pump-jack oil well is the primary means by which the system reduces the variations in power required by the induction motor of the pump-jack oil well.

It is another aspect of the present invention to provide a control system where the variation in the voltage or current of the [low frequency] load inverter over the operating cycle of a pump-jack oil well is the secondary means by which the system reduces the variations in power required by the induction motor of the pump-jack oil well and simultaneously is the primary means by which the system controls the slip and maximizes the efficiency of the induction motor(s).

It is another aspect of the present invention to provide a control system that can precisely control the insertion of kinetic energy into, and the extraction of kinetic energy from, the moving masses of the pump-jack oil well over the operating cycle of the well.

It is another aspect of the present invention to provide a control system that allows the rotational moving masses of the pump-jack oil well to function as a flywheel for energy storage.

It is another aspect of the present invention to provide a control system that allows the axially moving masses of the pump-jack oil well to function as an axial flywheel for energy storage.

It is another aspect of the present invention to provide a control system that can precisely control the instantaneous pumping work being performed by a pump-jack oil well or the instantaneous pumping work being extracted from a pump-jack oil well over the operating cycle of that well.

It is another aspect of the present invention to provide a control system that causes the total of the instantaneous pumping energy required/produced by pump-jack oil well(s) and the instantaneous kinetic energy extracted/inserted from/into pump-jack oil well(s) to be nearly constant over the operating cycle of the well(s).

It is another aspect of the present invention to provide a control system that minimizes thermal and centrifugal stress cycle damage to the turbogenerator's combustor, recuperator, turbine wheel, compressor wheel, and other components that can be caused by variations in turbogenerator operating power level, speed or temperature and which are, in turn, induced by the cyclical nature of pump-jack oil well operation.

It is another aspect of the present invention to provide a control system that minimizes the risk of combustor flame out that can occur when conventional turbogenerator fuel control systems reduce combustor fuel flow when the pump-jack's power requirements are at a minimum or are reversed during the pumping cycle.

It is another aspect of the present invention to provide a control system that avoids the need for parasitic loads with their resulting inefficiencies and avoids the inefficiencies associated with off optimum operations when fuel flow, temperature, and speed vary widely.

It is another aspect of the present invention to provide a control system that allows the peak electrical power required by a pump-jack oil well to be reduced by a factor of about four to one.

It is another aspect of the present invention to provide a control system that allows the size, weight, and cost of a turbogenerator that powers a pump-jack oil well to be reduced by a factor of about four to one.

It is another aspect of the present invention to provide a control system that allows the size, weight, and cost of the induction motor utilized by a pump-jack oil well to be reduced by a factor of about four to one.

It is another aspect of the present invention to provide a control system that utilizes current turbogenerator/motor/controller power data to compute the required variations in the frequency of the [low frequency] load inverter and the oil well's induction motor(s) that will minimize variations in the turbogenerator/motor power requirements during current oil well pumping cycles.

It is another aspect of the present invention to provide a control system that utilizes historical data on the variable frequency versus time profiles for the [low frequency] load inverter and the oil well's induction motor(s) that were previously established to minimize variations in the turbogenerator/motor power requirements during previous oil well pumping cycles to further reduce variations in power requirements during current oil well pumping cycles.

It is another aspect of the present invention to provide a control system that utilizes a once per pumping cycle signal generated by each oil well that is powered by a given turbogenerator to synchronize historical inverter frequency versus time data for that well.

It is another aspect of the present invention to provide a control system that utilizes shift registers to store the average [low frequency] load inverter frequency data in a manner that is frequency and phase locked to the pumping cycle of each oil well being powered by a given turbogenerator.

It is another aspect of the present invention to provide a control system that can compute (e.g. for the last 25 pumping cycles of a given oil well) the average frequency of the [low frequency] load inverter for any point within a pumping cycle (e.g. based on 30 points within a pumping cycle) for any given oil well being powered by a turbogenerator.

It is another aspect of the present invention to provide a control system that can compute the best or nearly best frequency for the [low frequency] load inverter at any point in time so as to minimize the variations in turbogenerator/motor power requirements when one or more pump-jack type oil wells are powered by that turbogenerator and do so based on historical frequency versus time data for the [low frequency] load inverter and once per pump cycle signals from all oil wells powered by that turbogenerator.

It is another aspect of the present invention to provide a control system that can compute the best or nearly best frequency for the [low frequency] load inverter at any point in time so as to minimize the variations in turbogenerator/motor power requirements regardless of whether:

There is only one or there are two, three, etc. oil wells being powered;

The various oil well pumping cycles are of the same duration or not;

The various oil well pumping cycles are in phase or out of phase; and

The various oil wells have average power requirements that are similar or different.

It is another aspect of the present invention to provide a control system that can assure nearly constant turbogenerator/motor power requirements while allowing the power requirements for individual oil wells to vary. This can be accomplished by averaging some of the power at the alternating current summing points where the induction motor power input leads are connected in parallel to the low frequency inverter's output leads.

A permanent magnet turbogenerator/motor 10 is illustrated in FIG. 1 as an example of a turbogenerator/motor for use with the power control system of the present invention. The permanent magnet turbogenerator/motor 10 generally comprises a permanent magnet generator 12, a power head 13, a combustor 14 and a recuperator (or heat exchanger) 15.

The permanent magnet generator 12 includes a permanent magnet rotor or sleeve 16, having a permanent magnet disposed therein, rotatably supported within a permanent magnet motor stator 18 by a pair of spaced journal bearings. Radial stator cooling fins 25 are enclosed in an outer cylindrical sleeve 27 to form an annular air flow passage which cools the stator 18 and thereby preheats the air passing through on its way to the power head 13.

The power head 13 of the permanent magnet turbogenerator/motor 10 includes compressor 30, turbine 31, and bearing rotor 36 through which the tie rod 29 passes. The compressor 30, having compressor impeller or wheel 32 which receives preheated air from the annular air flow passage in cylindrical sleeve 27 around the permanent magnet motor stator 18, is driven by the turbine 31 having turbine wheel 33 which receives heated exhaust gases from the combustor 14 supplied with air from recuperator 15. The compressor wheel 32 and turbine wheel 33 are rotatably supported by bearing shaft or rotor 36 having radially extending bearing rotor thrust disk 37. The bearing rotor 36 is rotatably supported by a single journal bearing within the center bearing housing while the bearing rotor thrust disk 37 at the compressor end of the bearing rotor 36 is rotatably supported by a bilateral thrust bearing. The bearing rotor thrust disk 37 is adjacent to the thrust face of the compressor end of the center bearing housing while a bearing thrust plate is disposed on the opposite side of the bearing rotor thrust disk 37 relative to the center housing thrust face.

Intake air is drawn through the permanent magnet generator 12 by the compressor 30 which increases the pressure of the air and forces it into the recuperator 15. In the recuperator 15, exhaust heat from the turbine 31 is used to preheat the air before it enters the combustor 14 where the preheated air is mixed with fuel and burned. The combustion gases are then expanded in the turbine 31 which drives the compressor 30 and the permanent magnet rotor 16 of the permanent magnet generator 12 which is mounted on the same shaft as the turbine wheel 33. The expanded turbine exhaust gases are then passed through the recuperator 15 before being discharged from the turbogenerator/motor 10.

The interface between the turbogenerator/motor controller 40 and the permanent magnet turbogenerator/motor 10 is illustrated in FIG. 2. The controller 40 generally comprises two bidirectional inverters, a low frequency load inverter 144 and a generator inverter 146. The controller 40 receives electrical power 41 from a source such as a utility through AC filter 51 or alternately from a battery through battery control electronics 71. The generator inverter 146 starts the turbine 31 of the power head 13 (using the permanent magnet generator as a motor and either utility or battery power), and then the low frequency load inverter 144 produces AC power using the output power from the generator inverter 146 to draw power from the high speed permanent magnet turbogenerator 10. The controller 40 regulates fuel to the combustor 14 through fuel control valve 44.

The controller 40 is illustrated in more detail in FIG. 3 and generally comprises the insulated gate bipolar transistors (IGBT) gate drives 161, control logic 160, generator inverter 146, permanent magnet generator filter 180, DC bus capacitor 48, low frequency load inverter 144, AC filter 51, output contactor 52, and control power supply 182. The control logic 160 also provides power to the fuel cutoff solenoid 62, the fuel control valve 44 and the ignitor 60. The battery controller 71 connects directly to the DC bus. The control logic 160 receives temperature signal 164, voltage signal 166, and current signal 184 while providing a relay drive signal 165.

Control and start power can come from either the external battery controller 71 for battery start applications or from the utility 41 which is connected to a rectifier using inrush limiting techniques to slowly charge the internal bus capacitor 48. For grid connect applications, the control logic 160 commands gate drives 161 and the solid state (IGBT) switches associated with the low frequency load inverter 144 to provide start power to the generator inverter 146. The IGBT switches are operated at a high frequency and modulated in a pulse width modulation manner to provide four quadrant inverter operation where the inverter 144 can either source power from the DC link to the grid or source power from the grid to the DC link. This control may be achieved by a current regulator. Optionally, two of the switches may serve to create an artificial neutral for stand-alone operations.

The solid state (IGBT) switches associated with the generator inverter 146 are also driven from the control logic 160 and gate drives 161, providing a variable voltage, variable frequency, three-phase drive to the generator motor 10 to start the turbine 31. The controller 40 receives current feedback 184 via current sensors when the turbine generator has been ramped up to speed to complete the start sequence. When the turbine 31 achieves self-sustaining speed, the generator inverter 146 changes its mode of operation to boost the generator output voltage and provide a regulated DC link voltage.

The generator filter 180 includes a plurality of inductors to remove the high frequency switching components from the permanent magnet generator power so as to increase operating efficiency. The AC filter 51 also includes a plurality of inductors plus capacitors to remove the high frequency switching components. In the event of a unit fault, the output contactor 52 disengages the low frequency load inverter 144 from the load inverter output lines 42 which are connected to the induction motor(s).

The fuel solenoid 62 is a positive fuel cutoff device which the control logic 160 opens during the start sequence and maintains open until the system is commanded off. The fuel control valve 44 is a variable flow valve providing a dynamic regulating range, allowing minimum fuel during start and maximum fuel at full load. A variety of fuel controllers, including liquid and gas fuel controllers may be utilized. The ignitor 60 would normally be a spark type device, similar to a spark plug for an internal combustion engine. It would, however, only be operated during the start sequence.

For stand-alone operation, the turbine is started using an external DC converter which boosts voltage from an external source such as a battery and connects directly to the DC link. After starting, the low frequency load inverter 144 can then be configured as a constant voltage, constant frequency source. However, the output is not limited to being a constant voltage, constant frequency source, but rather may be a variable voltage, variable frequency source. For rapid increases in output power demand, the external DC converter 71 supplies energy temporally to the DC link and to the power output, the energy is then restored to the energy storage and discharge system after a new operating point is achieved.

FIG. 4 generally illustrates a pump jack oil well system with a pumping unit 110 having a driving means 111 connected thereto with the apparatus suitably supported on base 112. A Samson post 113 supports a walking beam 114 which is pivotably affixed thereto by a saddle 115 which forms a journal.

The walking beam 114 has a horse-head attachment 116 at one end thereof so that a cable 117 can be connected at yoke 118 (including a load cell to provide real time monitoring of the rod load and its dynamic behavior including its resonant frequencies and resonant motions) to a polished rod 119 to enable a rod string located downhole in the well bore 120 to be reciprocated. The other end 121 of the walking beam 114 is journaled at 122 to a pitman or connecting rod 123. The other end of the connecting rod 123 is affixed to a crank 124 by means of journal 125. The crank 124 is affixed to a power output drive shaft 126 of a reduction gear assembly 127 with a counterbalance 128 affixed along a marginally free end portion of the crank 124.

The gear reducer 127 is mounted on a support 129 which is in turn mounted on the base 112. Driven gear or pulley 130 is attached by means of belts or chains 131 to the drive gear or pulley 132 which in turn is supported at 133 from base 134. An electrical induction motor 137 is adjustably mounted by hinge means on the support 133. The electrical induction motor 137 may include a rotating inertial mass 138.

FIG. 5 illustrates a graph of power requirements in watts versus operating time in seconds for the pump-jack oil well system generally described in FIG. 4 with power supplied from a utility grid. Region "A" represents the start of the pump-jack stroke. The crank arm 124 and counterweight 128 of the pump-jack passes through top dead center and the sucker rod begins its upward travel at approximately top dead center, depending on the exact positioning of the crankshaft center 126 with respect to the beam journal 122, and may be several degrees either side of top dead center. The induction motor power flows to the pump-jack until the crank arm is approximately thirty (30) degrees after top dead center at which point energy from the falling counterweight begins to contribute significantly to the liquid load pumping power (displacing motor power)

In region "B", energy released by the falling counterweight on the crank arm exceeds the liquid pumping load and tries to overspeed the drive motor turning it into a generator. During this period, electrical power is exported to the utility grid. In region "C", the counterweight has passed through bottom dead center and is rising. The sucker rod is travelling down under its own weight and the motor power goes almost exclusively to lifting the counterweight. Region "D" represents the period of time in the cycle when the counterweight is being raised and the sucker rod lowered while the liquid lift load occurs during Region "E".

More specifically, bottom dead center on the crank arm occurs at approximately five (5) seconds on the above scale. Between five and one-half (5½) seconds and eight and one-half (8½) seconds, the counterweight is being raised as the sucker rod lowers. The peak electrical demand of approximately twenty-six (26) kW occurs nearly ninety (90) degrees after bottom dead center. At eight and one-half (8½) seconds, the counterweight crosses top dead center where the liquid load is imposed.

At this point, there is little energy available from the counterweight as it is moving essentially horizontal so a secondary power peak occurs as liquid is being lifted before the counterweight begins to fall. At eleven (11) seconds, the falling counterweight delivers more power (torque) than required for liquid lift and the motor overspeeds (slightly) turning the motor into a generator that brakes the counterweight. Peak power generated is approximately eight (8) kW. About thirty (30) degrees after bottom dead center, the crank slows to below synchronous speed for the motor at which point power is required to lift the counterweight again.

FIG. 6 illustrates a detailed functional block diagram of the power control system of the present invention which includes three primary control loops used to regulate the turbogenerator gas turbine engine. The three primary control loops are the turbine exhaust gas temperature control loop 200, the turbogenerator speed control loop 202, and the power control loop 204. The speed control loop 202 commands fuel output to the turbogenerator fuel control 44 to regulate the rotating speed of the turbogenerator 10. The turbine exhaust gas temperature control loop 200 commands fuel output to the fuel control 44 to regulate the operating temperature of the turbogenerator 10. The minimum fuel command 210 is selected by selector 212 which selects the least signal from the speed control loop 202 and the turbine exhaust gas temperature control loop 200.

The pump-jack load profile, as illustrated in FIG. 5, consists of periods of variable load and periods of regenerative power generation (region B of FIG. 5). The possibility of turbogenerator overspeed can result, particularly when a stored thermal energy device such as a recuperator 15 is utilized as part of the turbogenerator 10. To prevent this overspeed and maximize the overall system efficiency, the pump jack speed can be increased to provide an inertial load and an increased oil pumping load which counter the regenerative load.

This is accomplished in part by a maximum turbogenerator speed control loop 214 that varies the frequency command to the low frequency load inverter 144 which varies the speed of the induction motor 137 of the pump-jack 110. The frequency offset signal 279 is produced from limitor 287. In addition, the speed of the pump-jack induction motor 137 can be varied to control maximum or transient turbine exhaust gas temperature by a maximum turbine exhaust gas temperature control loop 216. The frequency offset signal 218 is produced from limitor 280.

The turbogenerator power control system of the present invention and the turbogenerator which it controls are capable of being utilized by pump-jack oil well operators without the need for any special training. The turbogenerator 10 and control system are also capable of being moved from one group of one or more oil wells to another group of wells without any requirement to manually change any of the control system parameters.

The power control system can automatically adapt itself to powering any number of wells from one to the maximum number of oil wells permitted by the power level available from the turbogenerator 10 and can tolerate all of the oil wells requiring peak power at the same time or having peak power requirements staggered in time (out of phase). It can tolerate the total power required by the oil wells that it supplies being near the peak power capability of the turbogenerator 10 or being zero (with circuit breakers closed utilizing oil well hardware inertia for excess energy storage or with circuit breakers open using dissipative devices for excess energy rejection), or anywhere in between.

As illustrated in FIG. 6, the average frequency 240 that is desired for the three-phase electrical power produced by the low frequency or load inverter 144 is compared in summer or comparator 242 with the instantaneous frequency signal 243 produced by the inverter 144. The difference in these frequency values, the error signal 244, is utilized as the input to a turbogenerator speed command control loop 230 and a turbogenerator power command control loop 232. When the average over time of the error signal 244 is zero, the power utilized by the oil wells is equal to the power generated by the turbogenerator 10.

The turbogenerator speed command control loop 230, including proportional integral control 231, generates a recommended speed signal 245 for the turbogenerator 10 that should produce a level of electrical power equal to the power utilized by the oil wells. This recommended speed signal 245 is limited by limitor 246 to a maximum value equal to the maximum safe operating speed of the turbogenerator 10 and also is limited by the limitor 246 to a minimum value equal to the minimum speed at which the turbogenerator 10 can operate with no power output.

The proportional integral control 233 of the power command control loop 232 establishes a recommended power consumption level signal 234 for the oil wells that should match the level of electrical power produced by the turbogenerator 10. This recommended power consumption level signal 234 is limited by limitor 236 to a maximum value equal to the maximum power that can be produced by the turbogenerator 10 and is further limited by limitor 236 to a minimum value equal to zero as previously described.

The output signal 247 from the speed command control loop 230 constitutes a speed command 247 to the turbogenerator 10. This speed command 247 is compared in comparator 248 against the real turbogenerator speed feedback signal 206 from the turbogenerator 10. The error signal 249 between these two speed values is fed to the proportional integral control 203 of the speed control loop 202 to produce a recommended fuel flow signal 258.

The look up table 208 is used together with the real turbogenerator speed feedback signal 206 from the turbogenerator 10 to establish the recommended turbine exhaust gas temperature command 250 for the turbine. This recommended turbine exhaust gas temperature command 250 is compared in comparator 251 against the real turbine exhaust gas temperature feedback signal 207 from the turbogenerator 10 to produce a computed turbine exhaust gas temperature error signal 252. This computed turbine exhaust gas temperature error signal 252 is inputted into proportional integral control 254 in the turbine exhaust gas temperature loop 200 which computes a recommended fuel flow signal 256 that should eliminate the temperature error.

Selector 212 selects the lowest of the signals from the turbine exhaust gas temperature loop 200 and the speed control loop 202 and provides the lower signal to the limitor 260 which limits the recommended fuel flow to a maximum value equal to that required to produce the maximum power that the turbogenerator 10 produces and to a minimum value equal to the fuel flow below which the combustor 14 will experience flame out. The selected fuel flow value 262 is then used by the fuel control 44 to determine/deliver the required fuel flow rate to the combustor 14 of the turbogenerator 10. The resulting turbogenerator speed feedback signal 206 and turbine exhaust gas temperature feedback signal 207 are measured at the turbogenerator 10 and utilized elsewhere in the power control system.

The output 237 from limitor 236 constitutes the low frequency load inverter 144 average power command which is compared in comparator 264 with the real instantaneous power feedback signal 265 from the power sensor 270. The resulting error signal 266 is utilized in proportional integral control 268 to produce a recommended instantaneous inverter frequency signal 269 that should eliminate the power error.

Comparator 271 compares the speed feedback signal 206 from the turbogenerator 10 with the maximum safe speed signal 272 for the turbogenerator 10 to produce a speed error signal 273. If the speed of the turbogenerator 10 is greater than the maximum safe speed 272, the proportional integral control 274 establishes a recommended frequency increase signal 279 (limited in limitor 287) in the low frequency load inverter frequency and hence the pump-jack oil well speed that should eliminate the turbogenerator overspeed.

The turbine exhaust gas temperature feedback signal 207 from the turbogenerator 10 is compared with the maximum safe turbine exhaust gas temperature signal 275 in comparator 276 to produce an error signal 277. If the turbine exhaust gas temperature of the turbogenerator 10 is greater than the maximum safe temperature 275, the proportional integral control 278 establishes a recommended frequency increase signal 218 (limited in limitor 280) in the low frequency load inverter frequency and hence the pump-jack oil well speed that should eliminate the over temperature.

The instantaneous frequency input signal 243 is provided to frequency control 300 which also receives the pump frequency signal from each pump-jack oil well controlled by the control system, shown for purposes of illustration only as three, namely signals 301, 302 and 303.

The frequency control signal 306 from the historical frequency control 300 is provided to comparator or summer 282 which also receives signal 269 and both of the two inverter frequency reduction signals 279 and 218. The error signal 291 from summer 282 is provided to limitor 289 before going to the inverter 144. This limited error signal controls the frequency of the inverter 144 and provides a frequency limit signal 243 to both comparator 242 and to the look up table 290 which computes the inverter output voltage.

FIG. 7 is a functional block diagram of the historical frequency control 300 of the power control system illustrating how the low frequency load inverter frequency historical average, and current requirements are computed for three oil wells. Historical frequency control 300 includes a frequency computer for each pump-jack oil well which is being supplied with electrical power. Each of these frequency computers, shown for purposes of illustration as three, namely 350, 360, and 370 require a once per pump cycle signal 301, 302, and 303, respectively, from the associated pump-jack oil well. Each frequency computer determines the low frequency load inverter's frequency that it prefers at any point in time which should cause the power requirements of its oil well to be nearly constant over a complete pumping cycle. To compute the low frequency inverter's frequency at any point in time that will achieve nearly constant power requirements over time for all oil wells operating together, averaging block 380 receives signals 330, 331, and 332 from frequency computers 350, 360 and 370, respectively, and computes one best compromise frequency for the low frequency load inverter and all the induction motors of all the oil wells.

When more than one oil well is being powered by a turbogenerator, the power requirements of each induction motor do not need to be held constant as long as the sum of the requirements of all of the induction motors is a constant. Thus, there is, at any instant, a single frequency at which all induction motors (and thus the low frequency load inverter) can operate which will achieve a constant power requirement over time for the turbogenerator/motor. The averaging block 380 computes this frequency and outputs its value 306 to summer 282.

Each of the historical frequency computers 350, 360, and 370 requires a pulse signal 304 that is frequency and phase locked to the inverter frequency (six times output frequency is preferred) derived from the low frequency inverter.

FIG. 8 is a detailed functional block diagram of one of the historical frequency computers showing how the low frequency load inverter frequency requirements are computed for one oil well (prior to averaging for additional oil wells) based on historical data. While specifically illustrating historical frequency computer 350, it is equally applicable to historical frequency computers 360 and 370. For historical frequency computer 350, once per oil well pumping cycle signal 301 is inputted to pulse generator 310 which convert the analog pulse to a digital pulse. This signal pulse is then delayed approximately 50 nanoseconds and then used as a reset command input to inverter pulse totalizer register 313 and motor slip totalizer register 317. This delay is accomplished in delays 312.

This signal pulse from pulse generator 310 is also used undelayed to command an update of last value registers 314 and 318 and delayed to shift data in shift registries 315 and 319. This signal pulse is also used to update the computation of average values in registry 315 by functional block 316.

A pulse train 304 from the low frequency load inverter 144 is inputted to register 313 which functions as a totalizer for inverter cycles. The value in register 313 ramps up until it is reset by the next once per oil well cycle signal 301. Register 314 is updated to match the value in register 313 just before register 313 is reset and register 314 holds this value steady until register 314 is updated. The steady as opposed to ramping value in register 314 is sent to registry 315 which has perhaps 25 individual registers. Registry 315 will store separately the values of the number of inverter cycles (or multiples thereof) that have occurred during the last 25 oil well pumping cycles.

The average value of registry's 315 individual register values (25, for example) is computed each oil well cycle and retained in register 316. Registers 317, 318, and 320 are registers while registry 319 includes a plurality of shift registers. These perform the same functions as registers 313, 314, and 316 and shift registry 315 except that these four 317, 318, 319, and 320 process motor slip pulses instead of inverter pulses. Motor slip pulses are derived from slip pulse calculator 323 and are inputted into totalizer register 317.

Low frequency load inverter parameters including some but not all of: frequency, current, voltage, watts and/or power factor, can be used to compute fractional motor slip. For example, if inverter power output is negative, the induction motor is functioning as a generator and slip will be positive not negative. Low frequency load inverter 144 provides the inverter parameters to fractional slip computer 322 which computes fractional motor slip. Parallel digital data from fractional slip computer 322, along with inverter pulses 304, are inputted to slip pulse generator 323 which generates a stream of slip pulses which are inputted into totalizer register 317. Summer 324 combines the output from totalizer registers 313 and 317 (which ramp up during each oil well pumping cycle) with the quasi constant value of average slip from register 320 to produce a value that is proportional to induction motor rotor rotations and fractions thereof since the start of the last oil well pumping cycle.

The output from summer 324 is divided by the output of register 316 in divider 328 to produce a value that varies from 0.000 to 1.000 through the pumping cycle. The output of divider 328 is used to compute which of typically 30 pumping angle ranges the oil well is currently within. Registry 326 is used to compute and store the last value of inverter frequency for each pumping angle range while registry 325 stores average values over time for the inverter frequencies at each pumping angle range. Computer 329 selects from registry 325 the average historical frequency value 330 for low frequency load inverter for the current pumping position for each oil well represented by the frequency computer. Averager 380 receives each of the preferred frequency signals 330, 331 and 332 and provides an average signal to summer 282.

The turbogenerator 10 and pump jack oil wells 110 are deliberately operated at nearly constant power over the oil well's pumping cycle. Since, however, induction motors nominally have a power capability that is proportional to the motor's speed while the inductive impedance and the electromotive force generated voltage of the induction motor for constant current are both nominally proportional to inverter frequency and motor speed, operating the induction motor at constant voltage as the inverter/motor frequency varies can produce unacceptable results. Such operation can, for instance, cause the motor laminations to magnetically saturate at low frequency/speed, resulting in excessive current/heating and stator winding damage. Varying induction motor voltage approximately with the square root of inverter frequency is a viable alternative and allows the induction motor slip to be a low exponential (e.g. 0.5) inverse function of frequency/speed (the lower the frequency/speed the greater the slip).

The three-phase electrical power produced by the low frequency load inverter 144 passes through the power sensor 270. The signal 265 from the power sensor 270 is utilized by comparator 264 to assure that the power delivered by the low frequency inverter 144 to the pump-jack induction motor 137 is equal to the turbogenerator/motor power that is required to maintain the low frequency load inverter's average frequency at the desired level.

The desired average frequency of the low frequency load inverter 144 can be set equal to utility frequency (e.g. 50 or 60 Hertz) or it can be set to assure that the oil well pumps oil at the same rate as the oil seeps into the well from the surrounding strata.

Relatively independent control of the rate at which shaft power and electrical power can be converted into kinetic energy can be achieved by precisely controlling the acceleration and deceleration of both the axially moving and rotationally moving masses of the oil well. This kinetic energy can be cyclically stored by and extracted from the moving masses. In other words, changing the normal axial velocity versus time profile of the well's massive down hole moving components and oil allows the well to function as what can best be described as an "axial flywheel". Adjusting the frequency of the low frequency load inverter and the resulting speed of the well's induction motor also allows the oil pumping power to be controlled as a function of time. The sum of the well's oil pumping power requirements and the power converted into and extracted from the kinetic energies of the moving oil well masses is controlled so as to be nearly constant. Without this control system the power requirements of this type of oil well can vary over several seconds (typically eight (8)) by up to four (4) times the average power required by the well. This means that the size of the turbogenerator might otherwise have to be increased by a factor of four (4) and the turbogenerator might otherwise experience cyclical variations in operating speed and temperature, suffer excessive centrifugal and thermal stresses, and operate unstably and operate with low efficiency.

The improved power control system for the turbogenerator will allow a turbogenerator to provide electrical power to one or more periodically varying loads, such as the induction motors of pump-jack type oil wells, without the need to vary turbogenerator operating speed, fuel consumption or combustion temperature.

The required induction motor speed variances can be decreased by increasing induction motor inertia, for example, by the use of the inertial mass 138. Varying pump speed, augmenting inertia energy storage, and/or using an electrical energy storage device can all be used individually or in any combination to resolve energy regeneration and/or flatten the induction motor load profile (power versus time).

The present invention utilizes historical data on the variable frequency versus time profiles for the low frequency load inverter and the oil well's induction motor(s) that were previously established to minimize variations in the turbogenerator/motor power requirements during previous oil well pumping cycles to further reduce variations in power requirements during the current oil well pumping cycle. It further utilizes a once per pumping cycle signal generated by each oil well that is powered by a given turbogenerator to synchronize historical inverter frequency versus time data for that well.

Shift registers are employed to store the average low frequency load inverter frequency data in a manner that is frequency and phase locked to the pumping cycle of each oil well being powered by a given turbogenerator. The control system can compute (e. g. for the last 25 pumping cycles of a given oil well) the average frequency of the low frequency load inverter for any point within a pumping cycle (e. g. based on 30 points within a pumping cycle) for any given oil well being powered by a turbogenerator. It can compute the best or nearly best frequency for the low frequency load inverter at any point in time so as to minimize the variations in turbogenerator/motor power requirements when one or more pump-jack type oil wells are powered by that turbogenerator and do so based on historical frequency versus time data for the low frequency load inverter and once per pump cycle signals from all oil wells powered by that turbogenerator.

All of this can be accomplished regardless of the number of oil wells being powered, whether it be one, two, three or more. The various oil well pumping cycles are not required to be of the same duration and can be in phase or out of phase and the average power requirements of the oil wells can be similar or different. Nearly constant turbogenerator/motor power requirements can be achieved while allowing the power requirements for individual oil wells to vary by averaging some power at the alternating current summing points where the induction motor power input leads are connected in parallel to the low frequency inverter's output leads.

While specific embodiments of the invention have been illustrated and described, it is to be understood that these are provided by way of example only and that the invention is not to be construed as being limited thereto but only by the proper scope of the following claims.

What we claim is:

1. A system, comprising:
   a turbogenerator;
   a cyclic motion machine driven by an electric motor;
   a load inverter connected to said turbogenerator to deliver power to said motor; and
   a controller controlling said turbogenerator and said inverter to vary the frequency of said inverter in accordance with a variable frequency time profile for said electric motor based on historical machine cycle position and corresponding inverter frequency data to provide a substantially constant power level to said electric motor.

2. A system, comprising:
   a turbogenerator;
   a cyclic motion machine driven by an electric motor;
   a load inverter connected to said turbogenerator to deliver power to said motor; and
   a controller controlling said turbogenerator and said inverter to vary the frequency of said inverter in accordance with a variable frequency time profile for said electric motor based on historical machine cycle position and corresponding inverter frequency data to provide a substantially constant power level to said electric motor, wherein said variable frequency time profile is established by four control loops, one control loop providing a temperature safety limit, one control loop providing a speed safety limit, one control loop providing a power variation minimizing control based on instantaneous data and one control loop providing power variation minimizing control based on said historical data.

3. The system of claim 2 wherein said controller includes:
   a high frequency inverter synchronously connected to said turbogenerator;
   a direct current bus electrically connecting said high frequency inverter with said load inverter; and
   a processor to control the frequency and voltage/current of said high frequency inverter and said load inverter.

4. The system of claim 3 wherein said control loop providing a power variation minimizing control based on instantaneous data includes a first control loop to adjust fuel flow to said turbogenerator to match the power generated by said turbogenerator with the current power requirements of said electric motor, and a second control loop to adjust said load inverter frequency so that said electric motor power requirements match the current power generated by said turbogenerator.

5. The system of claim 3 wherein said cyclic motion machine driven by an electric motor is a pump-jack oil well having axially moving and rotationally moving masses, and said processor varies the frequency of said load inverter to accelerate and decelerate said axially moving and rotationally moving masses of said pump-jack oil well to control the power requirements of said electric motor driving said pump-jack oil well.

6. The system of claim 5 wherein the frequency of said load inverter is varied to minimize variations in the power requirements of said electric motor driving said pump-jack oil well over the operating cycle of said pump-jack oil well.

7. The system of claim 5 wherein the frequency of said load inverter is established to match the oil pumping rate of said pump-jack oil well with the rate at which oil seeps into the oil well.

8. The system of claim 3 wherein said cyclic motion machine driven by an electric motor is a pump-jack oil well, and said processor varies the instantaneous frequency of said load inverter over the operating cycle of said pump-jack oil well.

9. The system of claim 3 wherein said cyclic motion machine driven by an electric motor is a pump-jack oil well, and said processor varies the instantaneous voltage of said load inverter over the operating cycle of said pump-jack oil well.

10. The system of claim 3 wherein said cyclic motion machine driven by an electric motor is a pump-jack oil well, and said processor varies the instantaneous current of said load inverter over the operating cycle of said pump-jack oil well.

11. The system of claim 3 wherein said cyclic motion machine driven by an electric motor is a pump-jack oil well, and said processor varies the frequency of said load inverter over the operating cycle of said pump-jack oil well to reduce variations in the power requirements of said electric motor driving said pump-jack oil well.

12. The system of claim 3 wherein said cyclic motion machine driven by an electric motor is a pump-jack oil well, and said processor varies the voltage or current of said load inverter over the operating cycle of said pump-jack oil well to control the slip of said electric motor driving said pump-jack oil well.

13. The system of claim 3 wherein said cyclic motion machine driven by an electric motor is a pump-jack oil well, and, over the operating cycle of said pump-jack oil well, said processor controls the instantaneous pumping work performed by said pump-jack oil well and the instantaneous pumping work being extracted from said pump-jack oil well.

14. The system of claim 3 wherein said cyclic motion machine driven by an electric motor is a pump-jack oil well, and said processor causes the total of instantaneous pumping energy required or produced by said pump-jack oil well, and the instantaneous kinetic energy extracted from or inserted into said pump-jack oil well, to be substantially constant over the operating cycle of said pump-jack oil well.

15. A system, comprising:
    a turbogenerator;
    a plurality of cyclic motion machines each driven by an electric motor;
    a load inverter connected to said turbogenerator to deliver power to each of said motors; and
    a controller controlling said turbogenerator and said inverter to vary the frequency of said load inverter in accordance with a variable frequency time profile for said electric motor of each of said plurality of machines based on historical machine cycle position and corresponding inverter frequency data for each of said plurality of machines to provide a substantially constant total power level to said motors.

16. A system, comprising:
    a turbogenerator;
    a plurality of cyclic motion machines each driven by an electric motor;
    a load inverter connected to said turbogenerator to deliver power to said motor; and
    a controller controlling said turbogenerator and said inverter to vary the frequency of said load inverter in accordance with a variable frequency time profile for said electric motor of each of said plurality of machines based on historical machine cycle position and corresponding inverter frequency data for each of said plurality of machines to provide a substantially constant total power level to said motors, wherein said variable frequency time profile is established by four control loops, one control loop providing a temperature safety limit, one control loop providing a speed safety limit, one control loop providing a power variation minimizing control based on instantaneous data and one control loop providing power variation minimizing control based on said historical data.

17. The system of claim 16 wherein:

said plurality of cyclic motion machines each driven by an electric motor are a plurality of pump-jack oil wells;

said controller includes a high frequency inverter synchronously connected to said turbogenerator, a direct current bus electrically connecting said high frequency inverter with said load inverter, and a processor to control the frequency and voltage/current of said high frequency inverter and said load inverter; and said control loop providing a power variation minimizing control based on instantaneous data includes a first control loop to adjust fuel flow to said turbogenerator to match the power generated by said turbogenerator with the current power requirements of said plurality of pump-jack oil well's electric motors, and a second control loop to adjust said load inverter frequency so that the power requirements of said plurality of pump jack oil well's electric motors match the current power generated by said turbogenerator.

18. A system, comprising:

a turbogenerator including a permanent magnet generator/motor, a compressor, and a gas turbine having a combustor;

at least one pump-jack oil well driven by an electric induction motor;

a load inverter connected to said turbogenerator to deliver power to said motor; and a controller controlling said turbogenerator and said inverter to vary the frequency of said load inverter in accordance with a variable frequency time profile for said electric induction motor of said pump-jack oil well based on historical pump-jack oil well cycle position and corresponding inverter frequency data to provide a substantially constant power level to said motor.

19. A system, comprising:

a turbogenerator including a permanent magnet generator/motor, a compressor, and a gas turbine having a combustor;

at least one pump-jack oil well driven by an electric induction motor;

a load inverter connected to said turbogenerator to deliver power to said motor; and a controller controlling said turbogenerator and said inverter to vary the frequency of said load inverter in accordance with a variable frequency time profile for said electric induction motor of said pump-jack oil well based on historical pump-jack oil well cycle position and corresponding inverter frequency data to provide a substantially constant power level to said motor, wherein said controller includes a plurality of primary control loops.

20. The system of claim 19 wherein one of said primary control loops is a turbine exhaust gas temperature control loop.

21. The system of claim 19 wherein one of said primary control loops is a turbogenerator speed control loop.

22. The system of claim 19 wherein one of said primary control loops is a power control loop.

23. The system of claim 19 wherein said primary control loops include a turbine exhaust gas temperature control loop and a turbogenerator speed control loop.

24. The system of claim 19 wherein said primary control loops include a turbine exhaust gas temperature control loop and a power control loop.

25. The system of claim 19 wherein said primary control loops include a power control loop and a turbogenerator speed control loop.

26. The system of claim 19 wherein said primary control loops include a turbine exhaust gas temperature control loop, a turbogenerator speed control loop, and a power control loop.

27. The system of claim 26 wherein said turbine exhaust gas temperature control loop and said turbogenerator speed control loop command fuel input to the turbogenerator combustor.

28. The system of claim 27, further comprising:

a selector to select the minimum fuel command from said turbine exhaust gas temperature control loop and said turbogenerator speed control loop.

29. The system of claim 26 wherein said controller further comprises a turbogenerator speed command control loop and a turbogenerator power command control loop.

30. The system of claim 26 wherein said controller further comprises a maximum turbogenerator speed control loop and a maximum turbine exhaust gas temperature control loop.

31. A system, comprising:

a turbogenerator including a permanent magnet generator/motor, a compressor, and a gas turbine having a combustor;

at least one pump-jack oil well driven by an electric induction motor;

a load inverter connected to said turbogenerator to deliver power to said motor; and a controller controlling said turbogenerator and said inverter to vary the frequency of said load inverter in accordance with a variable frequency time profile for said electric induction motor of said pump-jack oil well based on historical pump-jack oil well cycle position and corresponding inverter frequency data to provide a substantially constant power level to said motor;

a high frequency inverter synchronously connected to said turbogenerator;

a direct current bus electrically connecting said high frequency inverter with said load inverter; and a processor to control the frequency and voltage/current of said high frequency inverter and said load inverter.

32. The system of claim 31 wherein said processor includes a plurality of primary control loops.

33. The system of claim 32 wherein one of said primary control loops is a turbine exhaust gas temperature control loop.

34. The system of claim 32 wherein one of said primary control loops is a turbogenerator speed control loop.

35. The system of claim 32 wherein one of said primary control loops is a power control loop.

36. The system of claim 32 wherein said primary control loops include a turbine exhaust gas temperature control loop and a turbogenerator speed control loop.

37. The system of claim 32 wherein said primary control loops include a turbine exhaust gas temperature control loop and a power control loop.

38. The system of claim 32 wherein said primary control loops include a power control loop and a turbogenerator speed control loop.

39. The system of claim 32 wherein said primary control loops include a turbine exhaust gas temperature control loop, a turbogenerator speed control loop, and a power control 3 loop.

40. The system of claim 39 wherein said turbine exhaust gas temperature control loop and said turbogenerator speed control loop command fuel output to the turbogenerator combustor.

41. The system of claim 40, further comprising:
a selector to select the minimum fuel command from said turbine exhaust gas temperature control loop and said turbogenerator speed control loop.

42. The system of claim 39 wherein said controller additionally includes a turbogenerator speed command control loop and a turbogenerator power command control loop.

43. The system of claim 39 wherein said controller additionally includes a maximum turbogenerator speed control loop and a maximum turbine exhaust gas temperature control loop.

44. The system of claim 31 wherein said processor utilizes a once per pumping cycle signal generated by each pump-jack oil well that is powered by said turbogenerator to synchronize said historical inverter frequency versus time data with said pump-jack oil well's pumping cycle position.

45. The system of claim 31 wherein said processor comprises shift registers to store the average load inverter frequency data to be frequency and phase locked to the pumping cycle of each said pump-jack oil well being powered by said turbogenerator.

46. The system of claim 31 wherein said processor computes the average historical frequency of the load inverter for any point within a pumping cycle for each said pump-jack oil being powered by said turbogenerator.

47. The system of claim 31 wherein said processor computes the substantially best frequency for the load inverter at any point in time to minimize the variations in turbogenerator power requirements of one or more pump-jack oil wells powered by said turbogenerator, said processor computing the substantially best frequency based on historical frequency versus time data for the load inverter and once per pump cycle signals from said pump-jack oil wells powered by said turbogenerator.

48. The system of claim 31 wherein said processor includes a frequency computer for each pump-jack oil well supplied with electrical power by said turbogenerator, said frequency computer receiving a once per pump cycle signal from its associated pump-jack oil well and computing the substantially best frequency for the load inverter.

49. The system of claim 48 wherein said processor additionally includes an averager to receive the computed frequencies from said frequency computer for each pump-jack oil well and to calculate a compromise frequency for each pump-jack oil well.

50. The system of claim 48 wherein each frequency computer includes a plurality of inverter pulse registers.

51. The system of claim 48 wherein each frequency computer includes a plurality of inverter pulse registers and a plurality of motor slip pulse registers.

52. A system, comprising:
a turbogenerator including a permanent magnet generator/motor, a compressor, and a gas turbine having a combustor;
a plurality of pump-jack oil wells each driven by an electric induction motor;
a load inverter connected to said generator to deliver power to said induction motors; and
a controller controlling said turbogenerator and said inverter to establish a variable frequency time profile for each said electric induction motor of each said plurality of pump-jack oil wells, said controller utilizing pump-jack oil well cycle position data and historical data on the variable frequency versus pump-jack oil well cycle position profile of each of said plurality of pump-jack oil wells to provide a substantially constant total power level to said induction motors.

53. A system, comprising:
a turbogenerator including a permanent magnet generator/motor, a compressor, and a gas turbine having a combustor;
a plurality of pump-jack oil wells each driven by an electric induction motor;
a load inverter connected to said generator to deliver power to said induction motors; and
a controller controlling said turbogenerator and said inverter to establish a variable frequency time profile for each said electric induction motor of each said plurality of pump-jack oil wells, said controller utilizing pump-jack oil well cycle position data and historical data on the variable frequency versus pump-jack oil well cycle position profile of each of said plurality of pump-jack oil wells to provide a substantially constant total power level to said induction motors, wherein said variable frequency time profile is established by four control loops, one control loop providing a temperature safety limit, one control loop providing a speed safety limit, one control loop providing a power variation minimizing control based on instantaneous data and one control loop providing power variation minimizing control based on historical data.

54. A method of controlling a system including a turbogenerator and a cyclic motion machine driven by an electric motor, comprising:
providing electrical power from said turbogenerator to said electric motor of said cyclic motion machine;
controlling said turbogenerator and said cyclic motion machine to establish a variable frequency time profile for said electric motor of said cyclic motion machine; and
utilizing cyclic motion machine cycle position data and historical data on the variable frequency versus cyclic motion machine cycle position profile to provide a substantially constant power level to said electric motor during repetitive cyclic motion cycles.

55. A method of controlling a system including a turbogenerator and a cyclic motion machine driven by an electric motor, comprising:
providing electrical power from said turbogenerator to said electric motor of said cyclic motion machine;
controlling said turbogenerator and said cyclic motion machine to establish a variable frequency time profile for said electric motor of said cyclic motion machine; and
utilizing instantaneous data on power and historical data on power to provide a substantially constant power level requirement for said turbogenerator during current repetitive cyclic motion cycles.

56. A method of controlling a system including a turbogenerator and a plurality of cyclic motion machines each driven by an electric motor, comprising:
providing electrical power from said turbogenerator to said electric motor of each of said plurality of cyclic motion machines through a load inverter connected to each said electric motor;

controlling said turbogenerator and said inverter to establish a variable frequency time profile for said electric motor of each of said plurality of cyclic motion machines; and utilizing cyclic motion machine cycle position data and historical data on the variable frequency versus cyclic motion machine cycle position profile to provide a substantially constant total power level to said electric motors during current repetitive cyclic motion cycles.

57. A method of controlling a system including a turbogenerator and a plurality of cyclic motion machines each driven by an electric motor, comprising:

providing electrical power from said turbogenerator to said electric motor of each of said plurality of cyclic motion machines through a load inverter connected to each said electric motor;

controlling said turbogenerator and said inverter to establish a variable frequency time profile for said electric motor of each of said plurality of cyclic motion machines, said variable frequency time profile being established by four control loops, one control loop providing a temperature safety limit, one control loop providing a speed safety limit, one control loop providing a power variation minimizing control based on instantaneous data and one control loop providing power variation minimizing control based on historical data; and utilizing cyclic motion machine cycle position data and historical data on the variable frequency versus cyclic motion machine cycle position profile to provide a substantially constant total power level to said electric motors during current repetitive cyclic motion cycles.

58. A method to reduce variations in the power level provided to a cyclic motion machine having cyclically varying power requirements, comprising:

connecting an induction motor to the cyclic motion machine to drive the machine;

connecting a load inverter to the motor to provide power to the motor;

monitoring the inverter frequency at a preselected number of machine positions during a machine cycle for a predetermined number of machine cycles to accumulate historical data; and varying the load inverter frequency over each machine cycle in accordance with the historical data to reduce variations in the power level required by the motor.

59. The method of claim 58, wherein varying the load inverter frequency comprises:

varying the load inverter frequency to accelerate the motor over preselected ranges of each machine cycle to reduce variations in the power level required by the motor.

60. The method of claim 59, wherein varying the load inverter frequency to accelerate the motor over preselected ranges of each machine cycle comprises:

varying the load inverter frequency to accelerate the motor during periods of reduced machine load over each machine cycle to insert kinetic energy into the machine and reduce variations in the power level required by the motor.

61. The method of claim 58, wherein varying the load inverter frequency comprises:

varying the load inverter frequency and the load inverter voltage.

62. The method of claim 61, wherein varying the load inverter frequency and the load inverter voltage comprises:

varying the load inverter voltage approximately with the square root of the load inverter frequency.

63. The method of claim 58, further comprising:

connecting a turbogenerator to the load inverter to provide power to the load inverter.

64. The method of claim 63, further comprising:

controlling the speed of the turbogenerator.

65. The method of claim 64, wherein controlling the speed of the turbogenerator comprises:

maintaining the speed of the turbogenerator at a generally constant level.

66. The method of claim 65, wherein maintaining the speed of the turbogenerator at a generally constant level comprises:

maintaining the speed of the turbogenerator generally at a level required to produce the power supplied by the load inverter to the motor.

67. The method of claim 64, wherein controlling the speed of the turbogenerator comprises:

maintaining the speed of the turbogenerator generally at a level required to maintain the average frequency of the load inverter substantially at a preselected level.

68. The method of claim 67, wherein maintaining the speed of the turbogenerator generally at a level required to maintain the average frequency of the load inverter substantially at a preselected level further comprises:

measuring the instantaneous power provided by the load inverter to the motor; and varying the load inverter frequency in response to the difference between the measured instantaneous power and a preselected motor power level.

69. The method of claim 58, wherein varying the load inverter frequency comprises:

maintaining the average frequency of the load inverter generally at the frequency of a utility grid connected to the load inverter.

70. The method of claim 58, wherein the machine is an oil well pump-jack, and varying the load inverter frequency comprises:

maintaining the average frequency of the load inverter generally at the frequency required to match the pumping rate of the pump-jack to the seepage rate of oil into the oil well.

71. The method of claim 58, further comprising:

connecting a controller to the load inverter to monitor and vary the load inverter frequency.

72. The method of claim 71, wherein connecting the controller further comprises:

providing a controller registry to accumulate the historical data.

73. The method of claim 72, wherein providing the controller registry comprises:

providing a controller registry to accumulate the historical data at each of a preselected number of machine positions during each machine cycle for a predetermined number of machine cycles.

74. The method of claim 73, wherein providing the controller registry comprises:

providing the controller registry to store the historical data to be frequency and phase locked to the cycles of the machine.

75. The method of claim 58, further comprising:

connecting an energy storage device to the inverter; and controlling the inverter to transfer excess energy produced by the machine from the motor to the energy storage device.

76. A method to reduce variations in the total power level provided to a plurality of cyclic motion machines having cyclically varying power requirements, comprising:

connecting an induction motor to each cyclic motion machine to drive the respective machine;

connecting a load inverter to the motors to provide power to the motors;

monitoring the inverter frequency at a preselected number of machine positions during a machine cycle for each machine over a predetermined number of machine cycles to accumulate historical data; and varying the load inverter frequency during the machines' cycles in accordance with the historical data to reduce variations in the total power level required by the motors.

77. The method of claim 76, wherein varying the load inverter frequency comprises:

varying the load inverter frequency in accordance with the average value of the historical data accumulated for the plurality of machines at each machine position.

* * * * *